US006629486B2

United States Patent
Forys et al.

(10) Patent No.: US 6,629,486 B2
(45) Date of Patent: Oct. 7, 2003

(54) RESETTABLE SEPARATION NUT WITH A LOW LEVEL OF INDUCED SHOCK

(75) Inventors: Christian Forys, Auvers sur Oise (FR); Olivier Jeanneau, Triel sur Seine (FR)

(73) Assignee: Pyroalliance, Les Mureaux (FR)

( * ) Notice: Subject to any disclaimer, the term of this patent is extended or adjusted under 35 U.S.C. 154(b) by 0 days.

(21) Appl. No.: 09/801,713

(22) Filed: Mar. 9, 2001

(65) Prior Publication Data

US 2001/0025564 A1 Oct. 4, 2001

(30) Foreign Application Priority Data

Mar. 29, 2000 (FR) ............................................ 00 03987

(51) Int. Cl.[7] ................................................ F42B 15/36
(52) U.S. Cl. .......................... 89/1.14; 60/638; 411/434
(58) Field of Search ............................. 89/1.14; 60/635, 60/636, 637, 638; 102/377, 378; 411/434

(56) References Cited

U.S. PATENT DOCUMENTS

| 3,149,456 A | * | 9/1964 | Sterrett |
| 3,910,154 A | * | 10/1975 | Gardner ..................... 411/434 |
| 3,926,090 A | | 12/1975 | Bunker |
| 4,064,783 A | * | 12/1977 | Ess |
| 4,187,759 A | | 2/1980 | Toy et al. |
| 4,412,420 A | * | 11/1983 | Patrichi et al. |
| 4,929,135 A | * | 5/1990 | Delarue et al. ............. 411/354 |
| 5,303,631 A | | 4/1994 | Frehaut et al. |
| 5,671,650 A | | 9/1997 | Aubret |

FOREIGN PATENT DOCUMENTS

| EP | 0 657 352 A1 | 6/1995 |
| FR | 2 616 857 | 12/1988 |

* cited by examiner

*Primary Examiner*—Michael J. Carone
*Assistant Examiner*—Troy Chambers
(74) *Attorney, Agent, or Firm*—Oliff & Berridge, PLC

(57) ABSTRACT

The technical field of the invention is that of devices for connecting and separating objects such as microsatellites with respect to a structure.

More specifically, the invention relates to a separation device (1) intended to release a screw (8) which holds two subassemblies of a structure together, this release taking place through the movement of a release ring (5) by virtue of the gases produced by a gas generator (3).

The main feature of the separation device (1) according to the invention is that a damping device, achieved by pressurizing a space (19) with the gases emitted by the generator (3), is created in order to decelerate then halt the release ring (5) before it can produce a mechanical shock at the end of its travel.

10 Claims, 1 Drawing Sheet

RESETTABLE SEPARATION NUT WITH A LOW LEVEL OF INDUCED SHOCK

The technical field of the invention is that of devices for connecting and separating objects such as microsatellites with respect to a structure. More generally, the items concerned are devices for the placement of satellites from a rocket, the purpose of which is to unlock the satellite from its support and move it rapidly away therefrom by ejection.

In this patent application, the concepts of "separation nut", "unlocking" and "unlocking device" are equivalent.

More specifically, the invention relates to a separation nut intended to release a screw which holds two subassemblies of a structure together, this release taking place through the movement of a release ring by virtue of the gases produced by a gas generator.

The particularity of the invention lies in the fact that the triggering of the unlocking device makes it possible, in a preliminary phase, to create a damping device intended to decelerate then gently halt the release ring just before it strikes a shutter. Thus, by avoiding a sharp mechanical shock, the equipment items secured to the structure connected to the separation nut are spared, thus ensuring clean and gentle separation of the two subassemblies. Now, as this separation has to occur very quickly, it would not be appropriate to try to slow down the mechanism by which the device works in order to get around this mechanical shock problem. Only the intervention of an appropriate damping device makes it possible to avoid any disruption due to a mechanical shock, while keeping the unlocking device operating extremely well.

Damping devices included in devices for unlocking two subassemblies already exist and have been covered by numerous patents. Mention may in particular be made of Patent FR 2 736 615 which relates to a split-nut unlocker for a microsatellite and of which the principle of operation, involving the sliding of various mechanical components such as, in particular, a release ring around a nut, is also well known. With a view to dissipating the shock upon impact of certain components, a solid damper is fixed to one of the ends of the device. A single figure of the device thus described reveals a significant bulk due to the presence of this solid damper.

U.S. Pat. No. 3,926,090 for its part describes a separation nut which also works on the principle of the sliding of various components. Damping is achieved by means of a chamber filled with air at ambient pressure, the said chamber being shuttered by a moving part. As the nut is triggered, the moving part tends to move sharply in the chamber. The air thus trapped becomes compressed under the effect of the diminishing volume, ending up forming a compressible pneumatic sausage that prevents the part from striking the end of the chamber. Such a damping system has the drawback of not being very reliable in so far as it is dependent on the chamber being sealed correctly, something which is difficult to achieve under such conditions. In addition, since the chamber is pressurized after the part has moved, the damping system has only a very small influence on the start of the travel of the part and has therefore to put up a great deal of resistance, this being even more unpredictable to master.

Finally, U.S. Pat. No. 4,187,759 relates to a separation nut, the principle of operation of which relies on the combined effect of movement of the release ring to release a split nut and thrust from an ejector to expel the connecting screw initially engaged in the nut. A spring is placed in the device to allow the release ring to return to its initial position and thus allow the separation nut to be reused. Although this is not specified in the patent, the said spring, by becoming compressed under the effect of the moving release ring, seems also to exert a function of decelerating the said ring. However, such a deceleration system is not very satisfactory in terms of damping in so far as the release ring, moving very fast over a very short space of time, sharply compresses the spring until its coils come into contact with one another, this act of becoming coil bound itself giving rise to a shock. Thus, while the spring can slightly attenuate the shock generated by the release ring, it is not capable, by itself, of ensuring that the shock is completely eliminated.

The unlocking device according to the invention, which works by the sliding of a release ring around a nut, has a pneumatic device for damping the said ring that makes it possible to get around all the aforementioned problems raised by the state of the art. This is actually achieved by simple influx of gas into a space belonging to the said unlocking device. It therefore does not involve any additional solid component specially designed for this damping function, thus avoiding needless additional load and bulk. In addition, as the influx of gas to the space occurs just before the ring moves or, at the latest, at the same time, the damping function occurs right from the start of the travel of the said ring, thus decelerating its movement right from the start and preventing this ring from acquiring too much kinetic energy which would always lead to an appreciable mechanical shock. Finally, regardless of the characteristics of the unlocking device used, it is always possible to adjust the "energy reserve/space volume" pairing so as to obtain total damping of the ring under all circumstances. To finish off with, the damping device included in the unlocking devices according to the invention maintains full effectiveness regardless of the temperature of the environment, unlike, for example, certain solid damping devices such as those employing elastomers which are ineffective at low temperature.

The subject of the present invention is concerned with a device for unlocking two subassemblies, comprising a body, a gas generator, a gas expansion chamber, a release ring, an ejector, a segmented nut, a connecting screw and a shutter, initiation of the gas generator causing the release of the gases in order, on the one hand, to cause the release ring to slide in such a way so as to release the segments of the nut and, on the other hand, bring the ejector up to speed so that it drives the connecting screw and ejects it from said nut, characterized in that a damping device achieved by the influx of a compressible fluid into a space of the unlocking device is created by the release of the gases, said damping device being intended to decelerate then halt the release ring before it reaches the shutter.

In order to be fully effective, the space needs to become filled with compressible fluid just before the release ring begins to move so that the pneumatic sausage can act right from the start of the said movement. One of the essential features of the damping device is that it does not exist when the unlocking device is not activated and that it does not come into operation until it will be of use to the said unlocking device. Advantageously, the gas generator is a pyrotechnic gas generator comprising a pyrotechnic charge and an initiation device. As a preference, the initiation device comprises an electropyrotechnic system. Advantageously, the damping device is achieved by pressurizing the space with gas. This is because, since the invasion of the space has to constitute an extremely short sequence in the overall unlocking process, a fluid in the form of a gas would seem to be a particularly appropriate solution.

As a preference, the space is pressurized by tapping gas from the expansion chamber using a connecting system that places the space in communication with said chamber. Thus, the source of energy of the unlocking device, which takes on the form of a gas generator, has the twofold function of operating the unlocking device and at the same time of creating a device for damping the release ring, so as to ensure separation of the two subassemblies without appreciable mechanical shock.

Advantageously, the release ring has a widened base, one face of which is in contact with the expansion chamber, and the space is an annular space located around the said ring and in the continuation of the said base, the connecting system being represented by an annular passage located between the body of the unlocking device and the external lateral surface of the widened base. Indeed it is desirable for the space to be near the expansion chamber so that the connecting system can be shortened and simplified and so as to allow it to be pressurized quickly. In addition, the said space needs to be integrated into the unlocking device without creating any additional volume liable to influence the overall size of the said device.

According to another embodiment of the invention, the widened base isolates the space from the expansion chamber and the connecting system comprises at least one duct passing through the said widened base to cause the said space to communicate with the said chamber. As a preference, the unlocking device comprises a return device allowing the ring which has moved during operation to return to its initial position when the gas generator is no longer producing gas.

In this way, the unlocking device returns to its preoperating starting configuration, and can thus be reused as it is without any modification. By this means, the unlocking device according to the invention can be tested once initially on the ground before being used in the actual configuration, in particular, on a rocket or on a missile if the test proves conclusive.

As a preference, the ejector is in the form of a cylindrical body, one end of which ends in a widened head opening into the expansion chamber and the other end of which rests against the connecting screw.

Advantageously, the ejector is housed in a separator that can be likened to an approximately cylindrical component, one end of which emerges in the expansion chamber, and the other end of which ends in a widened head resting against the nut.

Advantageously, the return device consists of a spring resting both against the widened head of the separator and the widened base of the release ring.

The way in which these components are arranged with respect to each other and their particular geometry have the sole purpose of contributing to the release of the segmented nut while at the same time pressing on the connecting screw to expel it. What happens is that the gases emitted by the gas generator will simultaneously push the separator at its end emerging in the expansion chamber and the ejector at its widened head. The thrust on the separator has the result of tending to open the nut via the widened head of the said separator, and the thrust exerted on the widened head of the ejector leads it to move in the separator with the result that the connecting screw against which it rests is expelled.

As a preference, the release ring and the nut each comprise at least two annular bulges, the cross sections of which exhibit sloping lines allowing these two components which, at rest, are in contact at their respective bulges, to slide one with respect to the other under the effect of the gases emitted, and then later to return to their position of rest.

The unlocking devices according to the invention involving a damping device for the release ring have the advantage of being economical and not very bulky. They are not very bulky in so far as the damping device does not exist for as long as the unlocking device is not triggered and is created in the form of an influx of gas that does not entail the participation of additional solid components especially designed for this damping function. They are economical because the damping device taps into a source of energy that already exists and does not need to be integrated into a parallel and self-contained fluid circuit with its own source of energy.

Finally, the damping device employed in the unlocking devices according to the invention has the advantage of maintaining its damping ability regardless of the temperature of the surroundings in which separation of the two subassemblies is to occur, unlike certain solid damping devices such as those using elastomers which are ineffective at low temperature.

A detailed description of one preferred embodiment of the invention is given hereinafter with reference to FIGS. 1 and 2.

Figure 1:
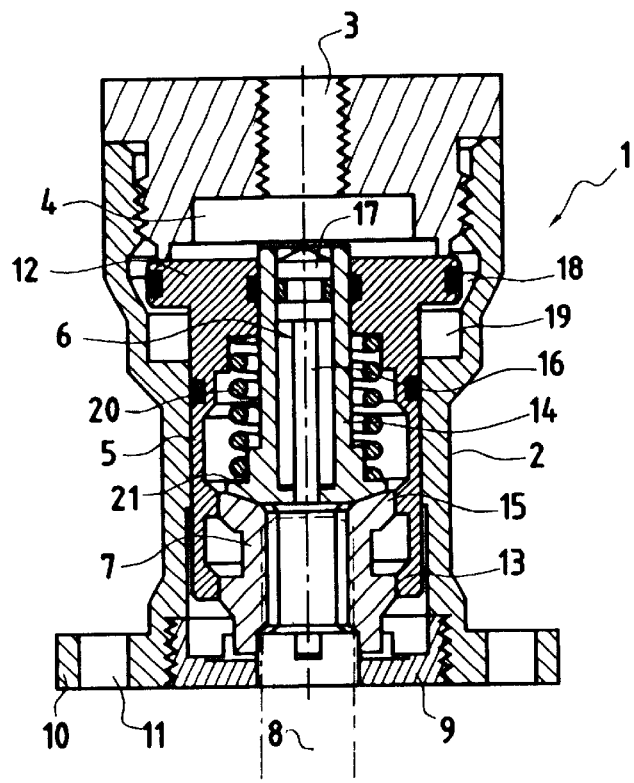
FIG. 1 is a view in longitudinal axial section of an unlocking device according to the invention which has not yet operated.

With reference to FIG. 1, an unlocking device 1 according to the invention comprises a hollow body 2, a gas generator 3, a gas expansion chamber 4, a release ring 5, an ejector 6, a segmented nut 7, a connecting screw 8 and a shutter 9. The body 2 is an approximately cylindrical component with two free ends, one of which has a widened base 10 comprising, on a peripheral annulus, two diametrically opposed bores 11 each intended to take a screw so as to secure the said unlocking device 1 to the second subassembly. At its two ends, the said body 2 has two flared portions manifested by two hollow cylindrical parts whose inside diameter is greater than that of the central part of the said body 2. The first flared portion corresponds to the upstream part of the unlocking device 1 and partially constitutes the gas expansion chamber 4, the second flared portion corresponding to the downstream part of the said device 1, that is to say the one in which the widened base 10 of the body 2 is located, and being intended to accommodate a component known as a shutter 9. The shutter 9 is in the form of a flat disc comprising a central bore and extended by a peripheral flange which is threaded on its external lateral surface, the said shutter 9 being intended to be screwed into the said downstream flared portion. The release ring 5 is a hollow cylindrical component with two free ends, one of which has a widened base 12 with a flat circular outer face equipped with a central bore. The said ring 5 has, passing through it, a central duct of variable cross section which, overall, has an upstream part of small diameter passing through the widened base 12, and a downstream part of larger diameter which, on its internal lateral wall, has two annular projections 13 similar to two mutually parallel annuli, each projection 13 having an approximately trapezoidal cross section, the top of which is flat, thus defining a flat annular upper face. One of the two projections is located at the free end of the downstream part of the central duct of the ring 5. The said ring 5 grips a segmented nut 7 and a hollow cylindrical component known as a separator 14, these two components 7 and 14 being in contact and in continuity one with the other. The nut 7, which has a roughly cylindrical shape, is split into four identical segments on four mutually perpendicular radial planes and, when the four segments touch, the said nut 7 has a threaded central duct into which is screwed a connecting screw 8 that connects the two subassemblies. The external lateral surface of the said nut 7 has two annular projections 15 similar to two mutually parallel annuli, each projection 15 having a roughly trapezoidal cross section the top of which is flat, thus defining a flat annular upper face. One of the two ends of the nut 7 ends in one of the two projections 15 and in relief is slightly convex. The two projections 15 of the nut 7 have the same separation as the two annular projections 13 located on the interior wall of the ring 5. The separator 14 consists of a hollow cylindrical body with, at one of its ends, a slightly concave widened head 21 with a central bore, the other end opening into the expansion chamber 4. The separator 14 contains an ejector 6 of roughly the same length which is a component consisting of a cylindrical body 16, one end of which ends in a slightly conical widened head 17 with a diameter roughly equal to the internal diameter of the separator 14. The various components described hereinabove are arranged with respect to each other as follows:

- The separator 14 has the same axis of revolution as the nut 7 and is in contact with said nut 7 via its slightly concave widened head 21 which butts against the slightly convex end of the nut 7.
- The ejector 6 is housed in the separator 14 in such a way that its cylindrical body 16 passes through the widened head 21 of the said separator 14 so as to rest against the connecting screw 8 located in the segmented nut 7 and in such a way that its widened head 17 lies flush with the end of the separator 14 emerging into the gas expansion chamber 4.
- The separator 14 is located in the upstream part of the central duct in the ring 5 and emerges from the flat cylindrical external face of the widened base 12 of the said ring 5.
- The segmented nut 7 is gripped in the ring 5 in such a way that its annular projections 15 are in contact with those 13 of the said ring 5 at their respective flat upper face. Positioned in this way, the nut 7 is in compacted form with touching segments.
- The release ring 5 is placed in the body 2 in such a way that its external lateral wall is in contact with the internal lateral wall of the said body 2 and its widened base 12 emerges in the corresponding flared portion at the upstream part of the unlocking device 1. Between the said flared portion and the central part of the body 2 there is a narrowed zone embodied by a bore of intermediate diameter, roughly equal to the outside diameter of the widened base 12 of the ring 5 which emerges in the flared portion. Thus, the difference in diameter between the widened base 12 of the ring 5 and the flared portion gives rise to an annular passage 18 connecting the gas expansion chamber 4 to an empty space that can be likened to an annular chamber 19, placed between the bore of intermediate diameter and the external lateral surface of the ring 5 located just behind the said base 12. The length of the ring 5 is such that, when positioned in this way, the said ring 5 leaves a gap between its opposite end to the one embodied by the widened base 12, and the shutter 9.

A slightly preloaded spring 20, located in the space between the separator 14 and the release ring 5, presses both against the widened head 21 of the said separator 14 and the internal face of the widened base 12 of the said ring 5.

As a preference, the gas generator 3 is a pyrotechnic gas generator.

Figure 2:
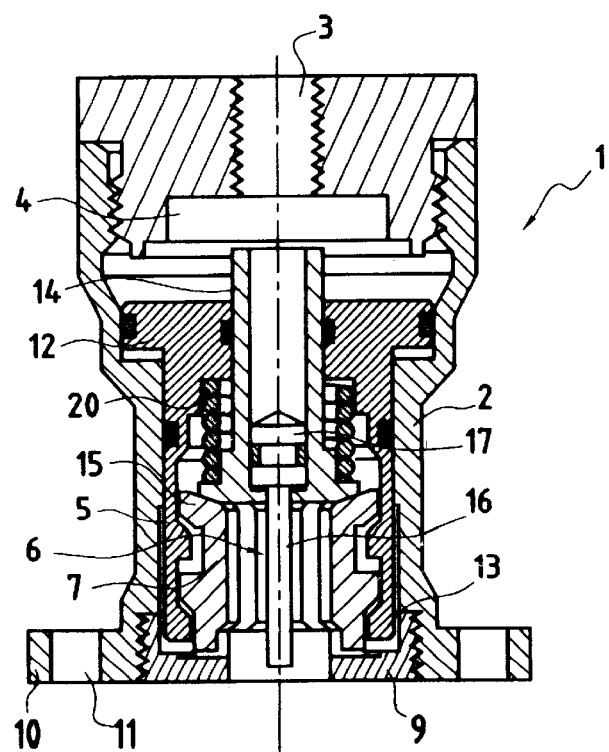
FIG. 2 is a view in longitudinal axial section of the device of FIG. 1 in the operating phase. Unlike what is shown in the figure, the spring never reaches its extreme stressed configuration, that is to say the configuration in which it is coil bound.

Referring to FIGS. 1 and 2, the way in which the unlocking device 1 according to the invention works is as follows. The pyrotechnic gas generator 3 receives an electrical impulse intended to initiate it. Once initiated, the gases emitted invade the expansion chamber 4 then rush into the annular passage 18 to pressurize the space 19. At the same time, the gases in the chamber 4 exert pressure on the widened head 17 of the ejector 6 and on the end of the separator 14 emerging in the said chamber 4. When the pressure in the said chamber 4 reaches a threshold level, the release ring 5 begins to move towards the shutter 9, on the one hand, allowing its widened base 12 to partially occupy the pressurized space 19 while at the same time closing the passage 18 and, on the other hand, allowing the nut 7 to be released, the segments of which nut will tend to open out like petals. In actual fact, the nut 7 opens out under the combined effect of the ring 5 moving, thus offsetting their annular projections 13, 15 from one another and of the separator 14 which tends to exert pressure on the said nut 7 via its widened head 21. The connecting screw 8, being detached from the nut 7 and experiencing thrust from the ejector 6, is expelled, allowing the two subassemblies to be separated cleanly. The release ring 5 ends its travel damped by the pneumatic sausage consisting of the pressurized space 19, thus avoiding striking the shutter 9 and therefore avoiding generating significant mechanical shock. When the pyrotechnic generator 3 stops producing gases, the spring 20, which was compressed during the movement of the ring 5 without ever reaching the extreme configuration in which it was coil bound, relaxes, returning the said ring 5 to its initial position for which its two annular bulges 15 come into contact with the two annular bulges 13 of the nut 7 at their flat annular upper face, the major result of this being the reconstruction of a continuous nut 7 through the return of the segments until they touch.

What is claimed is:

1. A device (1) for unlocking two subassemblies, comprising:
   a body (2) having a base (12) and a widened base (10), wherein the body (2) and base (12) define a space (19) and wherein the base (12) and a flared portion of the body (2) define a passage (18),
   a single gas generator (3),
   a gas expansion chamber (4) defined within the body (2), wherein the single gas generator is suitable to release gas in the gas expansion chamber,
   a release ring (5),
   a segmented nut (7), wherein the release ring (5) slides around the segmented nut split in segments,
   a connecting screw (8) that connects the two subassemblies and is screwed in the segmented nut (7),
   an ejector (6) configured to expel the connecting screw (8), and
   a shutter (9) connected to the base,
   wherein initiation of the gas generator (3) causes the release of gases and movement of the release ring (5) towards the shutter (9) in such a way so as to release the segments of the nut (7), and then move the ejector (6) to drive the connecting screw (8) and eject it from said nut (7), and
   a damping device that decelerates and halts the release ring (5) before it reaches the shutter (9), the damping being achieved by the influx of at least a portion of the gas from the generator through the passage (18) into the space (19) of the unlocking device (1), said passage (18) is closed by the movement of the release ring (5) to isolate the space (19) from the gas expansion chamber (4).

2. Unlocking device according to claim 1, characterized in that the gas generator (3) is a pyrotechnic gas generator comprising a pyrotechnic charge and an initiation device.

3. Unlocking device according to claim 1, characterized in that the damping device is achieved by pressurizing the space (19) with gas.

4. Unlocking device according to claim 3, characterized in that the space (19) is pressurized by tapping gas from the expansion chamber (4) using a connecting system that places the space (19) in communication with said chamber (4).

5. Unlocking device according to claim 4, characterized in that the release ring (5) has a widened base (12), one face of which is in contact with the expansion chamber (4), and the space (19) is an annular space located around the said ring (5) and in the continuation of the said base (12), the connecting system being represented by an annular passage (18) located between the body (2) of the unlocking device (1) and the external lateral surface of the widened base (12).

6. Unlocking device according to claim 1, characterized in that it comprises a return device (20) allowing the ring (5) which has moved during operation to return to its initial position when the gas generator (3) is no longer producing gas.

7. Unlocking device according to claim 1, characterized in that the ejector (6) is in the form of a cylindrical body (16), one end of which ends in a widened head (17) opening into the expansion chamber (4), and the other end of which rests against the connecting screw (8).

8. Unlocking device according to claim 7, characterized in that the ejector (6) is housed in a separator (14) that can be likened to an approximately cylindrical component, one end of which emerges in the expansion chamber (4), and the other end of which ends in a widened head (21) resting against the nut (7).

9. Unlocking device according to claim 6, characterized in that the return device (20) consists of a spring resting both against the widened head (21) of the separator (14) and the widened base (12) of the release ring (5).

10. Unlocking device according to claim 1, characterized in that the release ring (5) and the nut (7) each comprise at least two annular bulges (13, 15), the cross sections of which exhibit sloping lines allowing these two components (5, 7) which, at rest, are in contact at their respective bulges (13, 15), to slide one with respect to the other under the effect of the gases emitted, and then later to return to their position of rest.

* * * * *